(12) United States Patent
Komiyama

(10) Patent No.: US 8,907,618 B2
(45) Date of Patent: Dec. 9, 2014

(54) CONTACTLESS CELL APPARATUS

(75) Inventor: Shinji Komiyama, Saitama (JP)

(73) Assignee: Sony Corporation, Tokyo (JP)

( * ) Notice: Subject to any disclaimer, the term of this patent is extended or adjusted under 35 U.S.C. 154(b) by 552 days.

(21) Appl. No.: 12/821,237

(22) Filed: Jun. 23, 2010

(65) Prior Publication Data

US 2011/0018495 A1  Jan. 27, 2011

(30) Foreign Application Priority Data

Jul. 22, 2009 (JP) ................................. 2009-170806

(51) Int. Cl.
| | | |
|---|---|---|
| H02J 7/00 | (2006.01) | |
| H02J 7/02 | (2006.01) | |
| H01M 10/44 | (2006.01) | |
| H01Q 1/24 | (2006.01) | |
| H01M 10/46 | (2006.01) | |
| H01F 38/14 | (2006.01) | |

(52) U.S. Cl.
CPC ............ *H01M 10/441* (2013.01); *H01M 10/46* (2013.01); *H02J 7/025* (2013.01); *H01F 38/14* (2013.01); *H01Q 1/248* (2013.01)
USPC ......................................................... 320/108

(58) Field of Classification Search
CPC ....................................................... H02J 7/025
USPC ......................................................... 320/108
See application file for complete search history.

(56) References Cited

U.S. PATENT DOCUMENTS

| | | | | |
|---|---|---|---|---|
| 3,953,768 | A | * | 4/1976 | Meredith et al. ................ 361/92 |
| 5,973,677 | A | * | 10/1999 | Gibbons ........................ 345/179 |
| 7,830,141 | B2 | * | 11/2010 | Fujita et al. .................... 324/229 |
| 7,948,208 | B2 | * | 5/2011 | Partovi et al. .................. 320/108 |
| 8,169,185 | B2 | * | 5/2012 | Partovi et al. .................. 320/108 |
| 8,729,737 | B2 | * | 5/2014 | Schatz et al. ................... 307/104 |
| 2004/0145342 | A1 | * | 7/2004 | Lyon .............................. 320/108 |
| 2004/0251871 | A1 | * | 12/2004 | Dvorak et al. ................. 320/108 |
| 2005/0134213 | A1 | * | 6/2005 | Takagi et al. .................. 320/108 |

(Continued)

FOREIGN PATENT DOCUMENTS

| | | | |
|---|---|---|---|
| EP | 1 780 863 A2 | | 5/2007 |
| EP | 1780863 | * | 5/2007 |
| JP | 2005-117748 | | 4/2005 |

OTHER PUBLICATIONS

Search Report issued Nov. 5, 2010, in European Patent Application 10007029.1-1227.

*Primary Examiner* — Drew A Dunn
*Assistant Examiner* — Nathaniel Pelton
(74) *Attorney, Agent, or Firm* — Oblon, Spivak, McClelland, Maier & Neustadt, L.L.P.

(57) ABSTRACT

A cell apparatus that emits and receives AC power via magnetic field resonance includes a cell interface and a circuit to generate a magnetic field when emitting the AC power and to generate an AC current when exposed to a magnetic field from an external device. The cell apparatus also includes a switch or sensor to determine whether a charging mode or a discharging mode is active. Because the cell apparatus emits and receives AC power via magnetic field resonance, it can be charged and discharge without electrical contact with another device.

29 Claims, 10 Drawing Sheets

(56) References Cited

U.S. PATENT DOCUMENTS

| | | | |
|---|---|---|---|
| 2006/0022636 A1* | 2/2006 | Xian et al. | 320/108 |
| 2006/0181242 A1* | 8/2006 | Freed et al. | 320/109 |
| 2007/0178945 A1* | 8/2007 | Cook et al. | 455/572 |
| 2007/0182372 A1* | 8/2007 | Yang | 320/114 |
| 2008/0129252 A1* | 6/2008 | Nishino | 320/162 |
| 2009/0218884 A1* | 9/2009 | Soar | 307/11 |
| 2009/0273311 A1* | 11/2009 | Beers et al. | 320/108 |
| 2013/0043836 A1* | 2/2013 | Hui | 320/108 |

* cited by examiner

FIG. 4A CHARGE

FIG. 4B DISCHARGE

CHARGE

DISCHARGE

CONTACTLESS CELL APPARATUS

CROSS-REFERENCE TO RELATED APPLICATIONS

The present application contains subject matter related to that disclosed in Japanese Priority Patent Application JP 2009-170806 filed in the Japan Patent Office on Jul. 22, 2009, the entire content of which is hereby incorporated by reference.

BACKGROUND

1. Field

This invention relates to a cell apparatus which transmits AC (Alternating Current) power by wireless transmission to make transmission of AC power possible without contacts.

2. Discussion of the Background

A conventional secondary cell supplies DC (Direct Current) power to an electronic equipment of the portable type or the like and normally has a cylindrical shape or a square pole shape. The conventional secondary cell uses two positive and negative contacts, or terminals, to carry out charging and discharging therethrough.

FIG. 13 is a schematic diagram of a conventional secondary cell in a charging or discharging state. Referring to FIG. 13, the secondary cell 1 shown has a cylindrical shape and has a positive contact 2 on one end side of the cylinder in the direction of a center line thereof and a negative contact 3 at the other end side of the cylinder.

Usually, the secondary cell 1 is accommodated in a cell accommodating recess 4A provided on a housing 4 of a charger or an electronic equipment and carries out charging or discharging. In the cell accommodating recess 4A, for example, a leaf spring 5 made of a conductive metal material is provided such that the positive contact 2 of the secondary cell 1 is electrically coupled thereto, and, for example, a coil spring 6 made of a conductive metal material is provided such that the negative contact 3 of the secondary cell 1 is electrically connected thereto.

Where the housing 4 is provided on a charger, charging current Ic from a charging circuit 7 flows to the secondary cell 1 as seen in FIG. 14A to charge the secondary cell 1.

On the other hand, where the housing 4 is provided on an electronic equipment, discharging circuit Id from the secondary cell 1 flows to a load circuit 8 of the electronic equipment as in FIG. 14B and power is consumed by the load circuit 8.

Where such a conventional secondary cell 1 as described above is used, it exhibits such characteristics and problems as described below.

(1) It is necessary to connect the secondary cell and a circuit board in the inside of a charger or an electronic equipment by wire connection using a cable.

(2) In order to replace the cell in an electronic equipment, it is necessary to expose a cell accommodation section, and it is difficult to use an enclosed or waterproof structure for the electronic equipment.

(3) The contacts or terminals of the secondary cell must always be kept in a dirt-free state.

(4) Where the secondary cell is accommodated in an electronic equipment, it is necessary to provide a cell lid for the cell accommodating section to prevent coming off of the cell. It is to be noted that, where the secondary cell is configured integrally with a lid, such a cell lid as mentioned above is not required. However, where the secondary cell is of the type described, there is a drawback that the charger is configured for exclusive use for the cell.

(5) In a state wherein the secondary cell is accommodated in the cell accommodating section, since spring pressure is applied to the secondary cell in order to establish assured contact, it is not easy to take out the secondary cell.

(6) It is necessary to mechanically absorb the tolerance in size of the secondary cell.

(7) Since resiliency is required for a terminal on the cell accommodating section of a charger or an electronic equipment for accommodating a secondary cell, a useless expansion/contraction space is required for the charger or the electronic equipment.

(8) Since it is necessary for the terminals of the secondary cell to be exposed, it is difficult to prevent leakage of the cell liquid.

(9) Since the common secondary cell is accommodated in the cell accommodating section of an electronic equipment and used, one cell can drive only one electronic equipment at a time.

In order to solve the problems between a charger and a secondary cell described above, a contactless re-chargeable cell and a charger therefore wherein charging of a secondary cell is carried out by electromagnetic induction have been proposed in Japanese Patent Laid-Open No. 2005-117748 (hereinafter referred to as Patent Document 1).

According to the disclosure by Patent Document 1, the charger includes a primary coil for electromagnetic induction, and the contactless re-chargeable cell includes a secondary cell which excites induced current through an electromagnetic induction relationship to the primary coil. In the contactless re-chargeable cell, the current induced in the secondary coil is rectified into DC and a built-in secondary cell is charged with the DC.

When the contactless re-chargeable cell is incorporated in and used together with electronic equipment, it can be used quite similarly to a common dry cell or a common secondary cell. In particular, the contactless re-chargeable cell includes positive and negative contacts and can be used quite similarly as with a common dry cell or secondary cell by connecting the contacts to terminals of a cell accommodating section of an electronic equipment which are individually formed from a leaf spring and a coil spring.

The contactless re-chargeable cell of Patent Document 1 described above are improved in regard to the problems of the items (1), (5), (6) and (7) regarding the relationship between a charger and a secondary cell. However, the contactless re-chargeable cell of Patent Document 1 exhibits no improvement in regard to the other problems described above because it includes positive and negative metal contacts such that, when it is used, the metal contacts are connected to terminals of the cell accommodating section of an electronic equipment which are individually formed from a leaf spring and a coil spring.

Therefore, it is desirable to provide a secondary cell apparatus which can solve all of the problems of the items (1) to (9) described hereinabove by carrying out not only charging but also discharging in a contactless fashion.

SUMMARY

The present advancements provide a cell apparatus which emits and receives AC power via a magnetic field resonance coupling to an external device. The cell apparatus includes a cell interface to interface with a cell and a first circuit to generate, in a discharging mode, a magnetic field to induce an AC current in the external device. The first circuit also generates, in a discharging mode, an AC current from a magnetic field received from the external device. A conversion circuit to generate, in the charging mode, a charge signal from the AC current generated in the first circuit is also included in the cell apparatus. The conversion circuit supplied the charge signal to the cell interface. The cell apparatus also includes a frequency generator to generate, in the discharging mode, an AC current from a discharge signal received from the cell interface, and to supply the AC current to the first circuit.

Where the external device includes a resonance element, AC based on energy transmitted to the resonance element can be rectified into DC and used as power supply current to the external device.

In this manner, in the cell apparatus, energy corresponding to AC power is obtained from the external device by magnetic field resonance to carry out charging of a cell connected to the cell interface, and the energy corresponding to the AC power is transmitted to the external device through discharge of the cell connected to the cell interface through magnetic field resonance. Further, the external device may be a charger or another electronic equipment. Accordingly, the cell apparatus can exchange power not only with the charger but also with the electronic equipment without any contact. Consequently, the problems of a conventional secondary cell described hereinabove, which includes contacts, can be solved.

With the cell apparatus, since it obtains energy from the external device by means of magnetic field resonance to carry out charging of the cell connected to the cell interface and transmits the energy to the external device via magnetic field resonance by discharge of the cell connected to the cell interface, it can exchange power not only with a charger but also with an electronic equipment. Accordingly, the problems of a conventional secondary cell which includes contacts can be solved.

BRIEF DESCRIPTION OF THE DRAWINGS

The above and other objects, features and advantages of the present invention will become apparent from the following description and the appended claims, taken in conjunction with the accompanying drawings in which like parts or elements denoted by like reference symbols.

DETAILED DESCRIPTION

Before cell apparatus according to several preferred embodiments of the present invention are described, a power transmission system which uses a magnetic field resonance phenomenon which is used in the embodiments of the present invention is described.

[Power Transmission System which Uses Coupling Based on a Magnetic Field Resonance Relationship]

Figure 2:
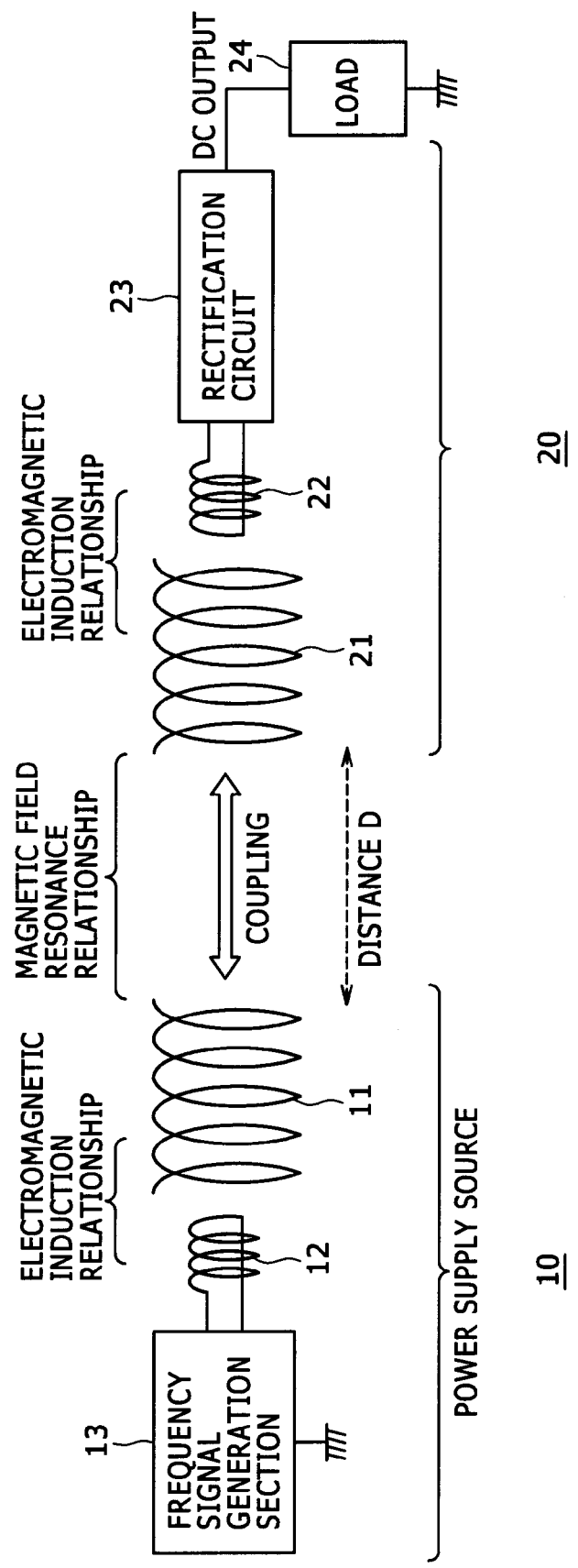
FIG. 2 is a schematic diagram of a power transmission system which utilizes a magnetic field resonance phenomenon.

FIG. 2 is an example of a configuration of a power transmission system which uses a magnetic field resonance phenomenon. Referring to FIG. 2, the power transmission system shown includes a power transmitting apparatus 10 which serves as a supplying source of power, that is, a power transmission side apparatus, and a power receiving apparatus 20 which serves as a supplying destination of the power, that is, a power reception side apparatus, provided in a one-by-one corresponding relationship.

The power transmitting apparatus 10 shown includes a resonance element 11, an excitation element 12, and a frequency signal generation section 13.

The resonance element 11 is formed, for example, from an air-core coil in the form of a loop coil. Meanwhile, the excitation element 12 is formed, for example, from an air-core coil and connected at the opposite ends of the coil thereof to two output terminals of the frequency signal generation section 13. The resonance element 11 and the excitation element 12 are configured so as to have a relationship wherein they are coupled strongly to each other by electromagnetic induction.

The air-core coil which composes the resonance element 11 has not only inductance but also capacitance and consequently has a self resonance frequency which depends upon the inductance and the capacitance.

The frequency signal generation section 13 generates a frequency signal of a frequency equal to the self resonance frequency of the resonance element 11. The frequency signal generation section 13 is formed from a Kollwitz type oscillation circuit or a Hartley type oscillation circuit.

Though not shown, the power transmitting apparatus 10 receives supply of power from an AC power supply, and the frequency signal generation section 13 thereof generates a frequency signal.

Meanwhile, the power receiving apparatus 20 shown in FIG. 2 includes a resonance element 21, an excitation element 22, a rectification circuit 23 and a load 24. The load 24 may be a load circuit. The power receiving apparatus 20 may have a configuration of any of various electronic equipments.

The resonance element 21 is formed, for example, from an air-core coil in the form of a loop coil similarly to the resonance element 11. Meanwhile, the excitation element 22 is formed, for example, from an air-core coil and connected at the opposite ends of the coil thereof individually to two input terminals of the rectification circuit 23. The resonance element 21 and the excitation element 22 are formed so as to have a relationship wherein they are coupled strongly to each other by electromagnetic induction.

Further, the air-core coil which forms the resonance element 21 has not only inductance but also capacitance and has a self-resonance frequency which depends upon the inductance and the capacitance similarly to the resonance element 11.

The self resonance frequencies of the resonance element 11 and the resonance element 21 are equal to each other and are represented by fo.

In the power transmitting apparatus 10 having such a system configuration as described above, a frequency signal of a frequency equal to the self resonance frequency fo of the resonance elements 11 and 21 is supplied from the frequency signal generation section 13 to the excitation element 12.

Accordingly, AC of the frequency fo flows through the air-core coil which forms the excitation element 12, and induced current of the same frequency fo is induced in the resonance element 11, which is formed from an air-core coil similarly, by electromagnetic induction from the excitation element 12.

In the system of FIG. 2, the self-resonance frequency of the air-core coil which forms the resonance element 21 of the power receiving apparatus 20 is the self resonance frequency fo and is equal to the self resonance frequency of the resonance element 11 of the power transmitting apparatus 10. Accordingly, the resonance element 11 of the power transmitting apparatus 10 and the resonance element 21 of the power receiving apparatus 20 have a magnetic field resonance relationship to each other, and the coupling amount between them is maximum and the loss by them is minimum at the frequency fo.

As described above, in the system described, since the resonance element 11 of the power transmitting apparatus 10 and the resonance element 21 of the power receiving apparatus 20 have a relationship of magnetic field resonance, AC is supplied at the self resonance frequency fo from the resonance element 11 to the resonance element 21 in a contactless fashion.

In the power receiving apparatus 20, induced current is induced in the excitation element 22 by electromagnetic induction by AC appearing in the resonance element 21. The induced current induced in the excitation element 22 is rectified into DC by the rectification circuit 23, and the DC is supplied as power supply current to the load 24.

In this manner, power is transmitted by wireless transmission from the power transmitting apparatus 10 to the power receiving apparatus 20 using a magnetic field resonance phenomenon.

With the wireless power transmission of the resonance type, power can be transmitted over such a distance as three to four meters and besides high power can be transmitted. Therefore, the present embodiment has an advantage that it is possible to readily construct even a system which does not have a secondary cell built in the power receiving side.

Further, since energy is not transmitted without a resonating mechanism, there is a characteristic that little influence is had on any other electronic equipment. Also there is an advantage that, even if alignment for coupling is not very good, the transmission efficiency does not drop very much.

[Cell Apparatus According to the Embodiments of the Invention]

First Embodiment

<Example of a Hardware Configuration>

A cell apparatus according to an embodiment of the present invention described below can be applied as an apparatus which receives power supply from the power transmitting apparatus 10 in FIG. 2 to charge a cell and supplies power to the power receiving apparatus 20 in FIG. 2.

Figure 1:
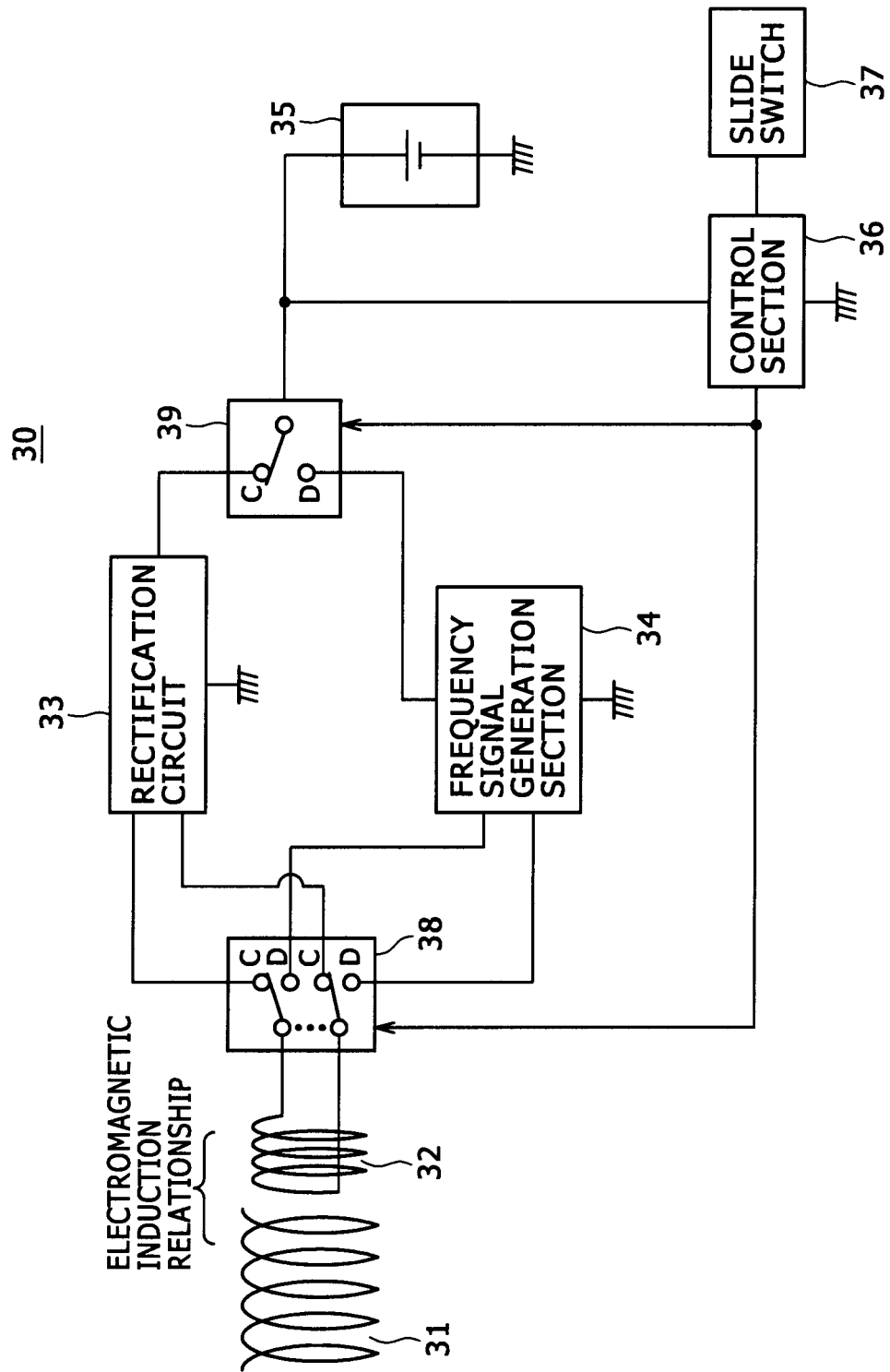
FIG. 1 is a block diagram of an exemplary configuration of a cell apparatus according to an embodiment of the present invention.

FIG. 1 is an example of a configuration of the cell apparatus according to an exemplary embodiment of the present invention.

Referring to FIG. 1, the cell apparatus 30 includes a first circuit having resonance element 31 and an excitation element 32, a rectification circuit 33, a frequency signal generation section 34, a cell 35, a control section 36, a slide switch 37, and switch circuits 38 and 39.

In the first circuit, the resonance element 31 is formed, for example, from an air-core coil in the form of a loop coil similarly to the resonance elements 11 and 21.

The air-core coil which forms the resonance element 31 has not only inductance but also capacitance and has a self resonance frequency which depends upon the inductance and the capacitance similarly to the resonance elements 11 and 21.

The self resonance frequency of the resonance element 31 is the frequency fo which is equal to the self resonance frequency of the resonance elements 11 and 21.

Meanwhile, the excitation element 32 is formed, for example, from an air-core coil. The resonance element 31 and the excitation element 32 are configured so as to have a relationship wherein they are coupled strongly to each other by electromagnetic induction. The air-core coil which forms the excitation element 32 is connected at the opposite ends thereof to the switch circuit 38.

The switch circuit 38 is provided to carry out changeover between a state wherein the opposite ends of the air-core coil which forms the excitation element 32 are individually connected to two input terminals of the rectification circuit 33, that is, a C side, and another state wherein the opposite ends of the air-core coil are individually connected to two input terminals of the frequency signal generation section 34, that is, a D side. In the circuit configuration of FIG. 1, the switch circuit 38 is controlled to carry out changeover by a changeover control signal from the control section 36.

cell 35 is may be a secondary or rechargeable cell formed, for example, from a nickel-cadmium storage cell or a nickel-hydrogen cell. However, as one of ordinary skill would recognize, other cells may be used without departing from the scope of the present invention. The cell 35 is connected at the positive terminal thereof to a movable terminal of the switch circuit 39. The switch circuit 39 changes over the connection object of the positive terminal of the cell 35 between the output terminal of the rectification circuit 33, that is, a C side, and the power supply terminal of the frequency signal generation section 34, that is, a D side. In the system shown, the switch circuit 38 is controlled for changeover by a changeover control signal from the control section 36.

Figure 3:
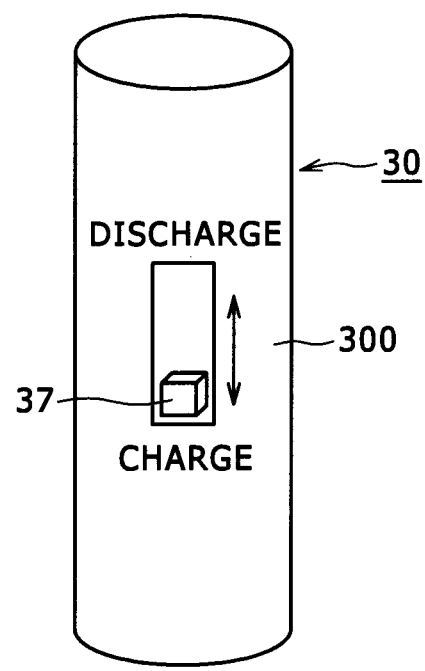
FIG. 3 is a schematic diagram of an exemplary configuration of the appearance of the cell apparatus according to an exemplary embodiment of the present invention.

The slide switch 37 is provided on a housing 300 of the cell apparatus 30 of the present embodiment as seen in FIG. 3. In particular, referring to FIG. 3, the cell apparatus 30 of the present embodiment has an appearance of a cylindrical shape, and the slide switch 37 is provided for sliding movement in a direction along the center line of the cylindrical housing 300 on the cylindrical housing 300.

A user can slidably move the slide switch 37 to selectively designate a charging state or charging mode and a discharging state or discharging mode for the cell apparatus 30. The slide switch 37 outputs a signal, which represents which one of the charging state position and the discharging state position the movable element thereof is positioned, to the control section 36.

Alternatively, the movable terminal of switch circuit 39 may be provided as a cell interface to connect to a cell, and cell 35 not provided.

The control section 36 decides based on the signal from the slide switch 37 which one of the charging state or charge mode and the discharging state or discharge mode is selectively designated by the user.

Then, if the control section 36 decides that the charging state or charge mode is selectively designated by the user as a result of the sliding movement of the slide switch 37, then it controls the switch circuits 38 and 39 so as to be change over to the C side described hereinabove with reference to FIG. 1, that is, to the state wherein the path of the rectification circuit 33 is selected.

On the other hand, if the control section 36 decides that the discharging state or discharge mode is selectively designated by the user as a result of the sliding movement of the slide switch 37, then it controls the switch circuits 38 and 39 so as to be change over to the D side described hereinabove with reference to FIG. 1, that is, to the state wherein the path of the frequency signal generation section 34 is selected.

<Operation>

Charging operation of charging the cell 35 of the cell apparatus 30 having such a configuration as described above and discharging operation of discharging from the cell 35 are described with reference to FIGS. 4A and 4B, respectively.

First, the charging operation of the cell 35 is described with reference to FIG. 4A.

In this instance, the power transmitting apparatus, or external device 10, in FIG. 2 is used as a charger. At this time, an AC plug 14 connected to the power transmitting apparatus 10 is connected to an AC plug socket as seen in FIG. 4A so that power is supplied to the power transmitting apparatus 10. It is to be noted that power may be supplied to the power transmitting apparatus 10 otherwise through an AC adapter.

Figure 4:
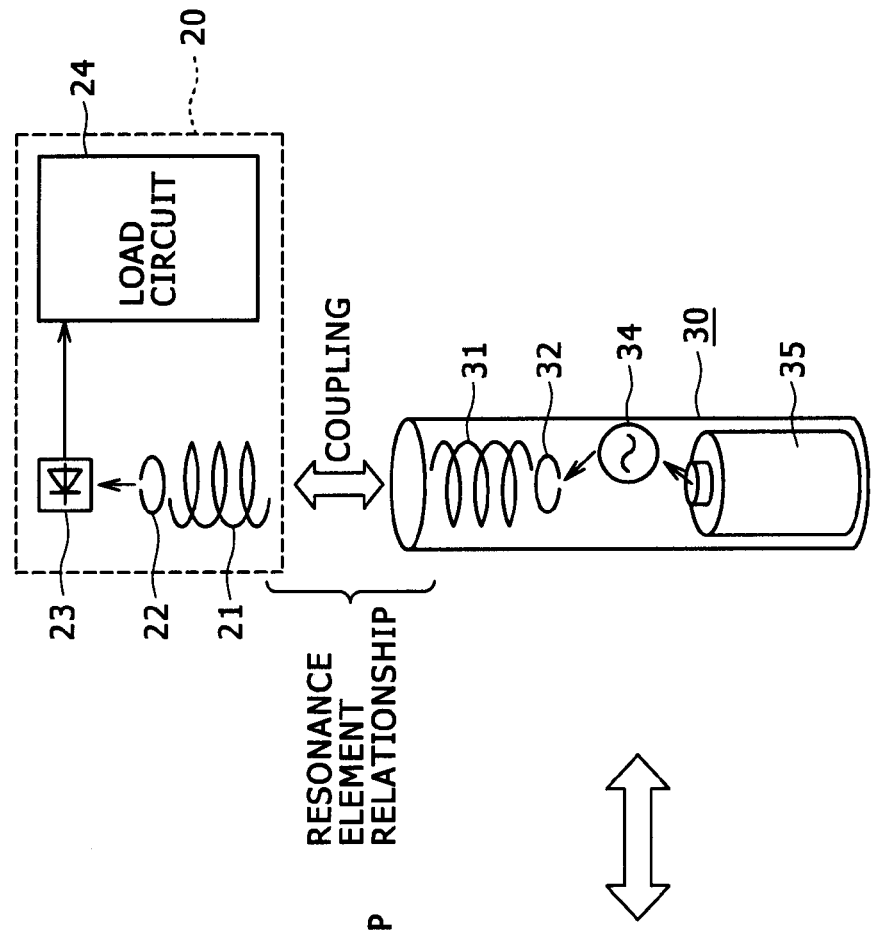
FIG. 4A is a schematic diagram of a charging mode of the cell apparatus according to an exemplary embodiment of the present invention.
FIG. 4B is a schematic diagram of a discharging mode of the cell apparatus according to an exemplary embodiment of the present invention.

Then, the user would place the cell apparatus 30 in an opposing relationship into the power transmitting apparatus 10 so that the resonance elements 11 and 31 of them may be positioned so as to establish a magnetic field resonance relationship to each other as seen in FIG. 4A.

Then, the user would slidably move the slide switch 37 to the charging state or charging mode side. Consequently, the control section 36 detects that the slide switch 37 is moved to the charging state or charging mode side and changes over the switch circuits 38 and 39 to the C side as in FIG. 1.

In this state, AC magnetic field energy is transmitted from the resonance element 11 of the power transmitting apparatus 10 to the resonance element 31 of the cell apparatus 30 by coupling between the resonance element 11 of the power transmitting apparatus 10 and the resonance element 31 of the cell apparatus 30 by a magnetic field resonance relationship to each other.

Then, induced current is induced in the excitation element 32 by electromagnetic induction by AC appearing in the resonance element 31. The induced current is supplied to the rectification circuit 33 through the switch circuit 38. The induced current is rectified into DC by the rectification circuit 33, and the DC is supplied to the cell 35 through the switch circuit 39 to charge the cell 35.

Now, discharging operation of the cell 35 is described with reference to FIG. 4B.

In this instance, the power transmitting apparatus 10 shown in FIG. 2 is used as a driven electronic equipment.

The user would position the cell apparatus 30 in an opposing relationship to the power receiving apparatus 20 as seen in FIG. 4B so that the resonance elements 21 and 31 of them may be positioned so as to establish a magnetic field resonance relationship to each other.

Then, the user would operate the slide switch 37 to slidably move to the discharging state or discharge mode side. Consequently, the control section 36 detects that the slide switch 37 is moved to the discharging state or discharging mode side and changes over the switch circuits 38 and 39 to the D side shown in FIG. 1.

In this state, in the cell apparatus 30, DC from the cell 35 is supplied as power supply current to the frequency signal generation section 34 through the switch circuit 39. Consequently, the frequency signal generation section 34 outputs a frequency signal of the resonance frequency.

Then, the frequency signal from the frequency signal generation section 34 is supplied to the excitation element 32 through the switch circuit 38.

Accordingly, AC of the frequency fo flows through the air-core coil which forms the excitation element 32, and induced current of the same frequency fo is induced in the resonance element 31, which is formed from an air-core coil similarly, by electromagnetic induction.

The self resonance frequency of the air-core coil which forms the resonance element 21 of the power receiving apparatus 20 is the frequency fo and is equal to the self resonance frequency of the resonance element 31 of the cell apparatus 30. Accordingly, the resonance element 31 of the cell apparatus 30 and the resonance element 21 of the power receiving apparatus 20 have a relationship of magnetic field resonance, and therefore, transmission of AC magnetic field energy is carried out between them. Consequently, AC is supplied in a contactless fashion from the resonance element 11 to the resonance element 21 at the frequency fo.

In the power receiving apparatus 20, induced current is induced in the excitation element 22 by electromagnetic induction by AC appearing in the resonance element 21. The induced current induced in the excitation element 22 is rectified into DC by the rectification circuit 23, and the DC is supplied as power supply current to the load 24.

In this manner, power is transmitted by wireless transmission from the cell apparatus 30 to the power receiving apparatus 20, that is, to a driven electronic equipment, using a magnetic field resonance phenomenon.

As described above, the cell apparatus 30 of the present embodiment carries out energy exchange by wireless transmission through an AC magnetic field. Therefore, although the charger requires a power transmitting equipment and the driven electronic equipment body requires a power receiving equipment, energy exchange can be carried out in a contactless fashion between the cell apparatus 30 of the present embodiment and the charger and driven electronic equipment.

The cell apparatus 30 of the present embodiment fundamentally eliminates such a work for accommodating or fitting the same into the cell accommodating section of a charger or a driven electronic equipment as is required for a conventional secondary cell or the contactless re-chargeable cell of Patent Document 1.

Therefore, it is necessary to explicitly indicate on the cell apparatus 30 in which one of the charging state or charging mode and the discharging state or discharge mode the cell apparatus 30 is. In the embodiment described above, the slide switch 37 plays a role of the explicit indication means.

[Other Forms of the Cell Apparatus]

The explicit indication means of the charging mode and the discharging mode is not limited to such manual operation means as the slide switch in the example described above but may be configured in various manners.

Second Embodiment

Figure 5:
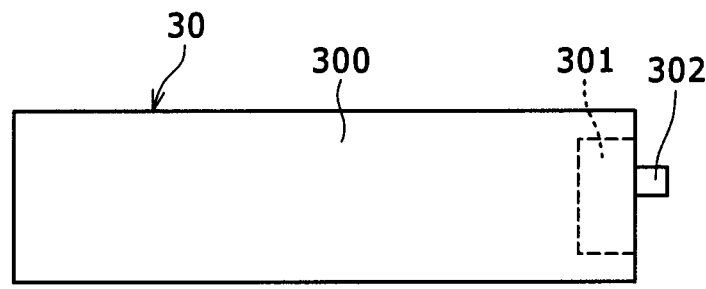
FIG. 5 is schematic diagram of an example of a configuration of a cell apparatus according to a second exemplary embodiment of the present invention.
Figure 6:
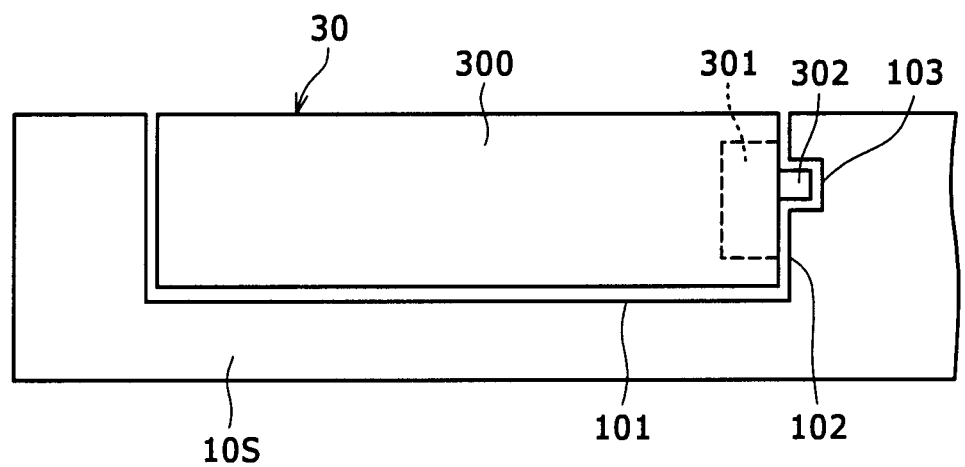
FIG. 6 is a schematic diagram of a charge mode of the cell apparatus according to the second exemplary embodiment of the present invention.
Figure 7:
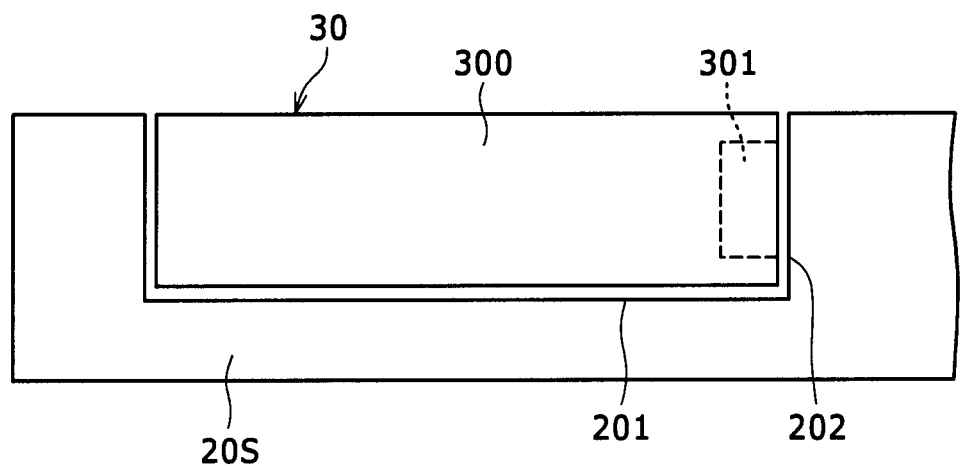
FIG. 7 is a schematic diagram of a discharging mode of the cell apparatus of according to the second exemplary embodiment of the present invention.

FIGS. 5 to 7 show a second embodiment of the present invention wherein the cell apparatus 30 of the first embodiment described hereinabove includes a microswitch 301 which is used as explicit indication means of a charging state and a discharging state of the microswitch 301. In other words, the second embodiment is similar to the first embodiment described hereinabove except that the microswitch 301 is used in place of the slide switch 37 used in the first embodiment.

In the second embodiment, the microswitch 301 is provided in the cell apparatus 30 such that an operating element 302 of an actuator section of the self-reset type thereof projects outwardly of the housing 300 of the cell apparatus 30. In the present example, the microswitch 301 is provided in the cell apparatus 30 such that the operating element 302 can be moved along a direction of the center line of the housing 300.

Further, in the present example, an accommodation section 101 for the cell apparatus 30 is provided on a housing 10S of the power transmitting apparatus 10 which serves as a charger as seen in FIG. 6. A recessed portion 103 is formed on a side inner face 102 of the accommodation section 101 in an opposing relationship to the operating element 302 of the microswitch 301 when the cell apparatus 30 is accommodated in the accommodation section 101.

Furthermore, in the present example, another accommodation section 201 for the cell apparatus 30 is provided in a housing 20S of a driven electronic equipment or power receiving apparatus of an object of discharge as seen in FIG. 7. In this instance, such a recessed portion as is provided in the case of the charger is not provided on a side inner wall 202 of the accommodation section 201.

Accordingly, in a state wherein the cell apparatus 30 is accommodated in the accommodation section 101 of the power transmitting apparatus 10 which is formed as a charger, the operating element 302 of the microswitch 301 is received in the recessed portion 103 and remains in the projecting state to the outside. In other words, the microswitch 301 is placed into a first changeover state.

On the other hand, if the cell apparatus 30 is accommodated into the accommodation section 201 of the housing 20S of a driven electronic equipment or power receiving apparatus of an object of discharging, then the operating element 302 of the microswitch 301 is pressed by the side inner face 102 so that it is placed into a state wherein it is pushed in to the inside of the microswitch 301. In other words, the microswitch 301 is placed into a second changeover state different from the first changeover state.

In the second embodiment, the control section 36 detects a signal corresponding to a changeover state from the microswitch 301 in FIG. 1 in place of the slide switch 37 to decide whether an instruction of the charge mode or another instruction of the discharge mode is received.

Then, the control section 36 controls changeover of the switch circuits 38 and 39 in such a manner as described above in response to a result of the mode decision. In particular, when the microswitch 301 is in the first changeover state, the control section 36 changes over the switch circuits 38 and 39 to the C side of FIG. 1 so as to select the path of the rectification circuit 33. In other words, the cell apparatus 30 is placed into the charge mode state.

On the other hand, when the microswitch 301 is in the second changeover state, the control section 36 changes over the switch circuits 38 and 39 to the D side in FIG. 1 so as to select the path of the frequency signal generation section 34. In other words, the cell apparatus 30 is placed into the discharge mode state.

It is to be noted that, in the description of the second embodiment above, an accommodation section for the cell apparatus of the embodiment of the present invention is provided on a charger as a power transmitting apparatus and a driven electronic equipment as a power receiving apparatus. However, an accommodation section for the cell apparatus of the embodiment may not be provided in such apparatus as mentioned above but may assume a form of a cell accommodating adapter.

In particular, an accommodation section for the cell apparatus of the embodiment is provided on a cell accommodating adapter. As the accommodation section of the cell accommodating adapter, two accommodation sections including such an accommodation section for charging as seen in FIG. 6 and such another accommodation section for discharging as seen in FIG. 7 are provided.

Or, also it is possible to assume a configuration wherein only an accommodation section for the cell apparatus of the embodiment is provided on a cell accommodating adapter. In this instance, in order to establish the charge mode, the cell apparatus 30 of the embodiment is accommodated into the accommodation section as seen in FIG. 6. On the other hand, in order to establish the discharge mode, the cell apparatus 30 of the embodiment is accommodated into the accommodation section such that the operating element 302 side of the microswitch 301 of the cell apparatus 30 of the embodiment is opposed to a side inner wall of the accommodation section remote from the side inner wall on which the recessed portion 103 is formed in FIG. 6. At this time, the cell accommodating adapter preferably has an explicit indication thereon which indicates the cell apparatus can be changed over between the charge mode and the discharge mode in response to the accommodation direction of the cell apparatus 30 of the embodiment in the accommodation section.

It is to be noted that, while a microswitch is used in the present second embodiment, since only it is necessary to allow detection of the charge mode and the discharge mode based on the state of a movable member, the detection method is not limited to the method which uses a microswitch.

Third Embodiment

A third embodiment of the present invention is directed to the explicit indication means for the charge mode and the discharge mode of the cell apparatus 30 according to the present invention.

Figure 8:
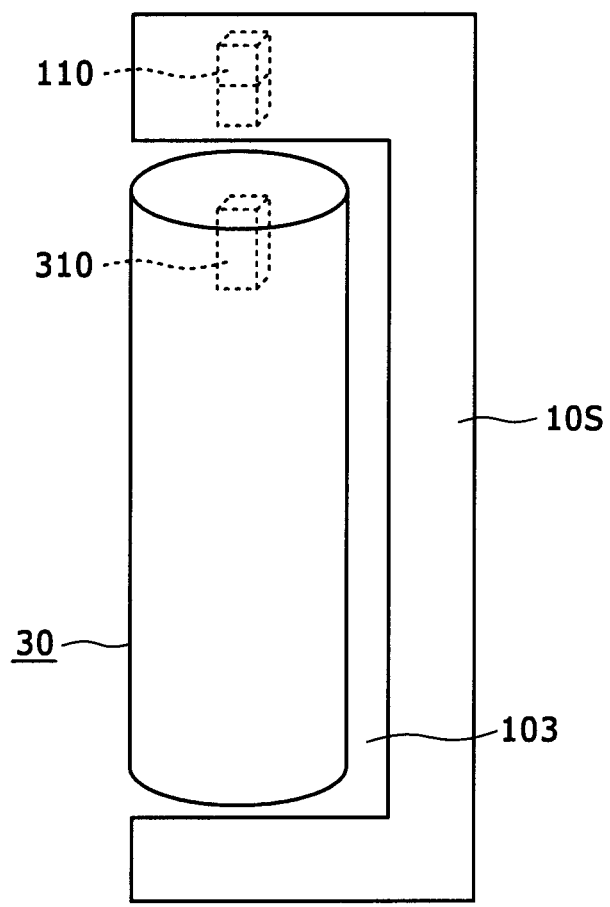
FIG. 8 is a schematic diagram of an example of a configuration of a cell apparatus according to a third exemplary embodiment of the present invention.

Also in the third embodiment, an accommodation section 101 for a cell apparatus 30 is provided on a housing 10S of a power transmitting apparatus 10 serving as a charger as seen in FIG. 8. However, there is no necessity to provide an accommodation section for the cell apparatus 30 on a housing 20S of a driven electronic equipment or power receiving apparatus of an object of discharging.

Further, in the third embodiment, for example, a permanent magnet 110 is provided on the housing 10S as seen in FIG. 8 while a magnetic field sensor 310 for detecting a magnetic field of the permanent magnet 110 is provided on the cell apparatus 30.

Figure 9:
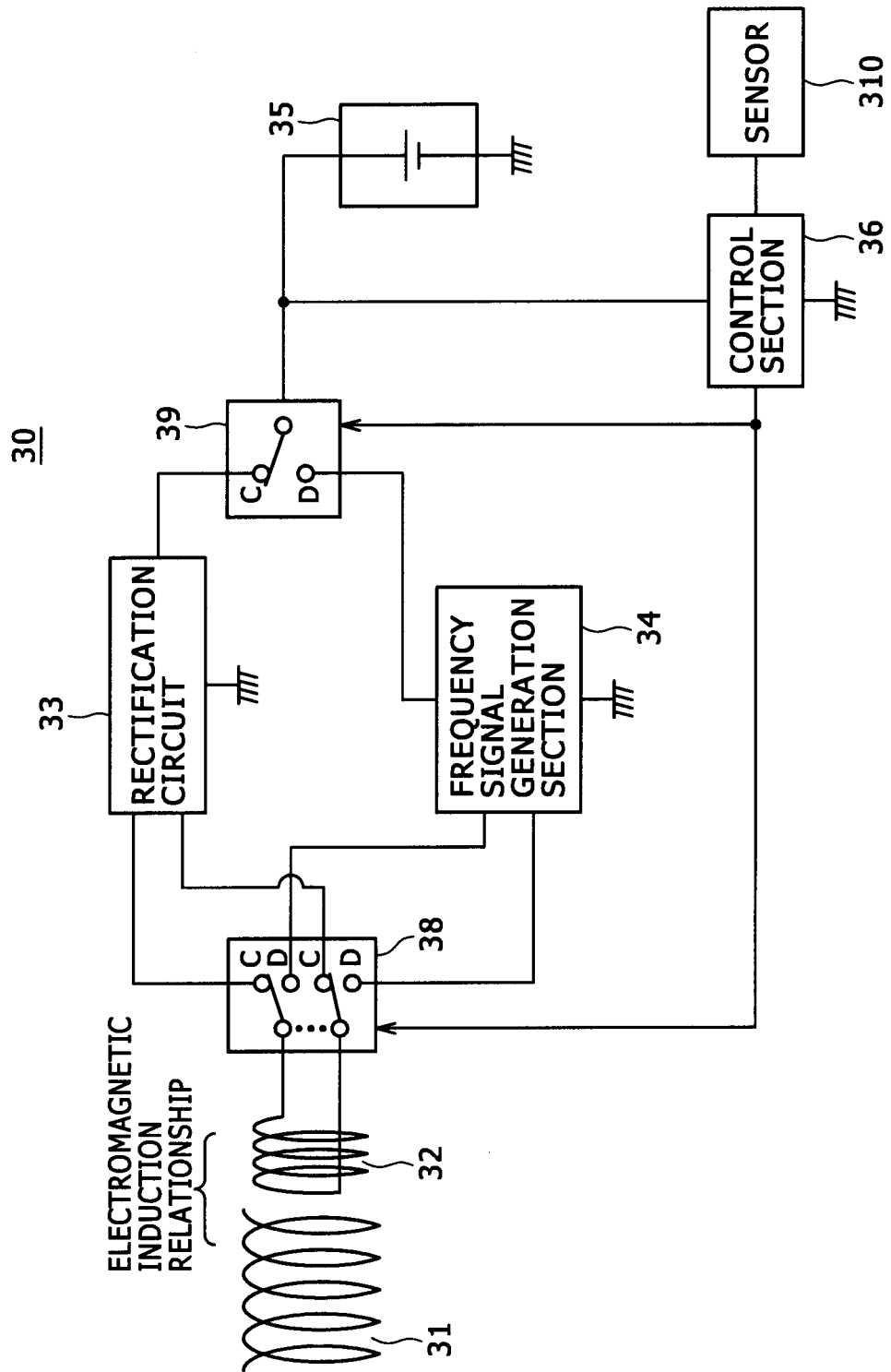
FIG. 9 is a block diagram of an example of a configuration of the cell apparatus of according to the third exemplary embodiment of the present invention.

An example of a hardware configuration of the cell apparatus 30 in the third embodiment is shown in a block diagram of FIG. 9.

As can be recognized from FIG. 9, in the present third embodiment, the cell apparatus 30 includes a magnetic field sensor 310 in place of the slide switch 37 in the first embodiment or the microswitch in the second embodiment, and a sensor output of the magnetic field sensor 310 is supplied to the control section 36. The other part of the cell apparatus 30 has a configuration quite same as that in the first embodiment.

Figure 10:
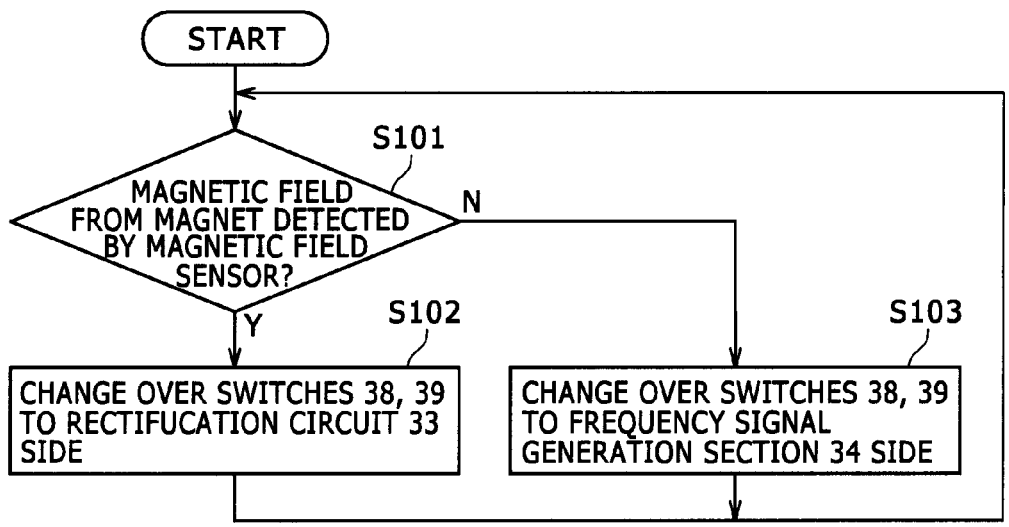
FIG. 10 is a flow chart of a mode changeover operation of the cell apparatus according to the third exemplary embodiment of the present invention.

In the third embodiment, the control section 36 carries out changeover control of the switch circuits 38 and 39 in such a manner as illustrated in FIG. 10. In the present example, the control section 36 can be configured using a microcomputer or a microprocessor.

In particular, referring to FIG. 10, the control section 36 normally supervises a sensor output of the magnetic field sensor 310 to decide whether or not a magnetic field from the permanent magnet 110 of a charger is detected at step S101.

If the control section 36 decides at step S101 that a magnetic field from the permanent magnet 110 is detected by the magnetic field sensor 310, then it changes over the switch circuits 38 and 39 to the C side of FIG. 8 to select the path of the rectification circuit 33 at step S102. In other words, the control section 36 places the cell apparatus 30 into the discharge mode state. Then, the processing returns from step S102 to step S101.

On the other hand, if the control section 36 decides at step S101 that a magnetic field from the permanent magnet 110 is not detected, then the control section 36 changes over the switch circuits 38 and 39 to the D side of FIG. 1 to select the path of the frequency signal generation section 34 at step S103. In other words, the control section 36 places the cell apparatus 30 into the discharge mode state. Then, the processing returns from step S103 to step S101.

It is to be noted that, while, in the third embodiment described above, a magnetic field sensor is used, the sensor for distinguishing the charge mode and the discharge mode from each other is not limited to a magnetic field sensor, but some other sensor such as an optical sensor can naturally be used instead.

[Advantages of the Cell Apparatus 30 of the Embodiments]

Where the cell apparatus 30 of the embodiments described above are used, the following advantages can be achieved.

(a) There is no necessity to use a cable to connect the cell apparatus and a circuit board in the inside of an equipment to each other.

(b) Since a mechanical consideration regarding accommodation of a cell is little required in design and a wire connection mechanism is not required, the degree of freedom in design of an apparatus is high.

(c) Since no cell accommodation section is required and a wire connection mechanism is not required, restrictions to design of an equipment are reduced.

(d) Since no terminal for a cell is provided, a mechanical failure can be eliminated.

(e) Since no terminal for a cell is required, a waterproof and dustproof mechanism can be achieved readily.

(f) If the cell apparatus of the embodiments are formed in an enclosed structure, then there is no possibility of leakage of the liquid.

(g) Since the cell apparatus of the embodiments may generally be provided in the proximity of an equipment, a lid for the cell can be eliminated.

(h) Since the cell apparatus of the embodiments may generally be provided in the proximity of an equipment, the cell can be removed and accommodated readily.

(i) Since energy exchange by wireless transmission is applied, it is possible to supply energy to a plurality of apparatus.

It is to be noted that the cell apparatus can be applied not only to the system which uses coupling based on a magnetic field resonance relationship described above but also to another system which utilizes electromagnetic induction or a radio wave as described hereinabove. However, with the cell apparatus of the embodiments described, since transmission of charging power and discharging power is carried out using coupling based on a magnetic field resonance relationship, there are advantages that the power transmission distance is long and that, even if alignment of a transmitter and a receiver is not carried out strictly, a high transmission efficiency can be maintained.

[Embodiment of an Application Form of the Cell Apparatus 30 of the Embodiments]

Figure 11:
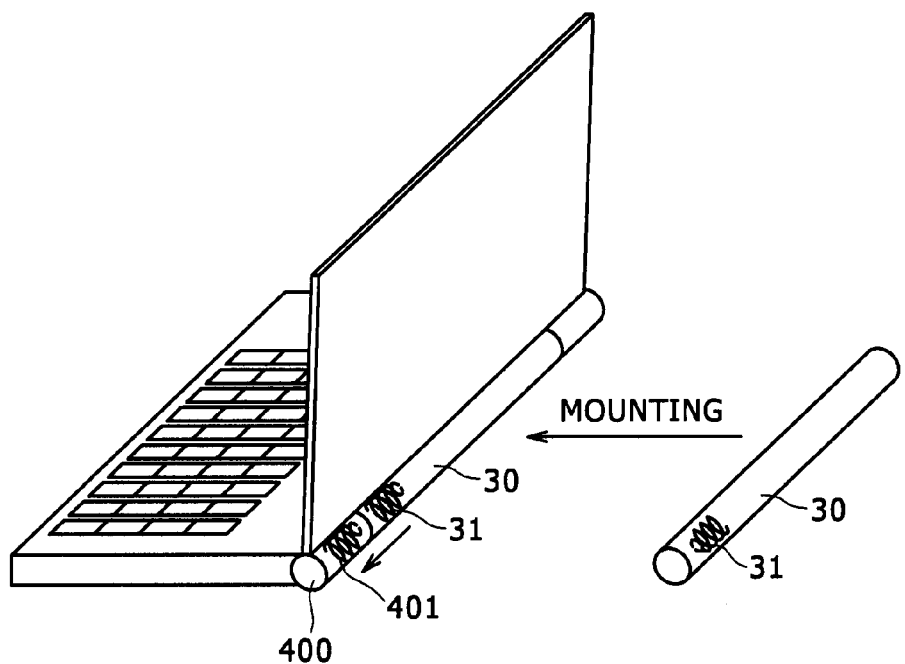
FIG. 11 is a schematic diagram of an application form of the cell apparatus according to the exemplary embodiments of the present invention.

As an example which utilizes the advantages described in the items (g) and (h) above, such a form of use as illustrated in FIG. 11 is available. In particular, FIG. 11 shows a notebook type personal computer or a portable apparatus foldable like a notebook wherein a resonance element 401 for power reception or the like is provided at a hinge section 400 for opening and closing movement.

Referring to FIG. 11, the cell apparatus 30 of any embodiment is fitted into an intermediate portion of the hinge section 400. In this fitted state, the resonance element 31 of the cell apparatus 30 and the resonance element 401 for power reception are placed in a state wherein they are coupled to each other by a magnetic field resonance relationship. Consequently, power can be supplied from the cell apparatus 30 to the notebook type personal computer or the portable apparatus.

Figure 12:
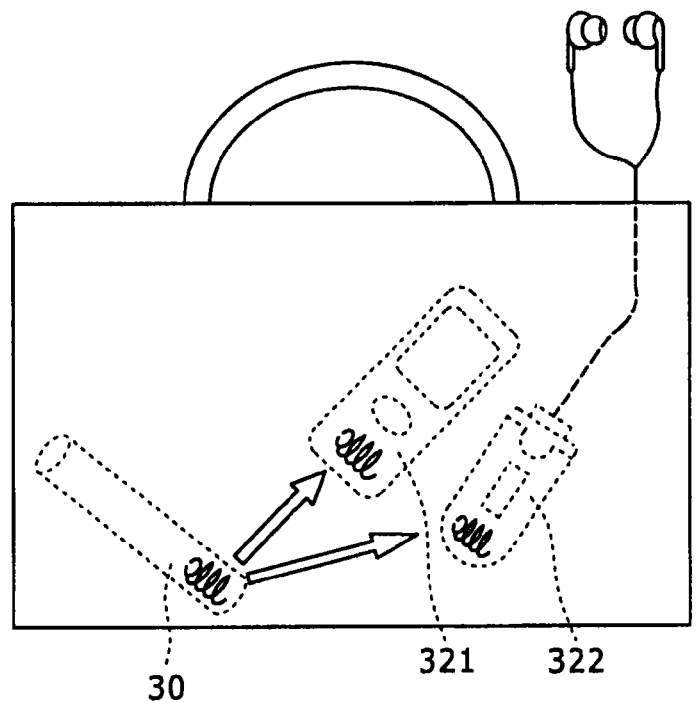
FIG. 12 is a schematic of another application form of the cell apparatus according to the exemplary embodiments of the present invention.
Figure 13:
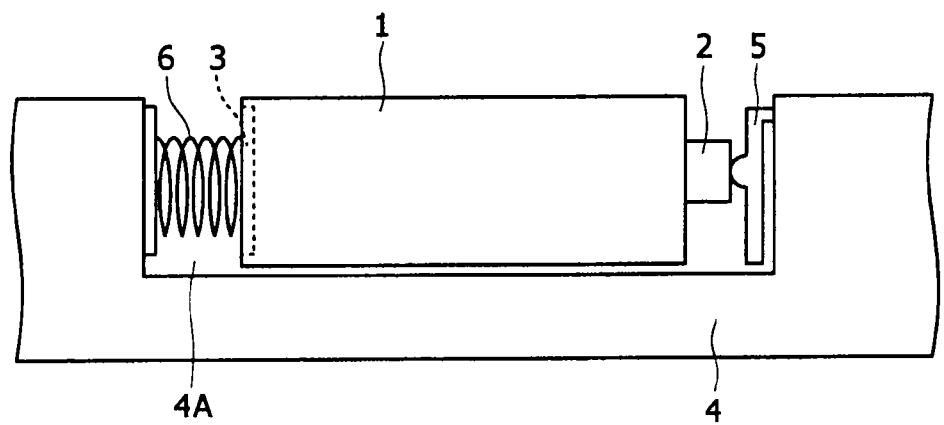
FIG. 13 is a schematic diagram of a manner of use of a conventional secondary cell upon charging and discharging.
Figures 14A, 14B:
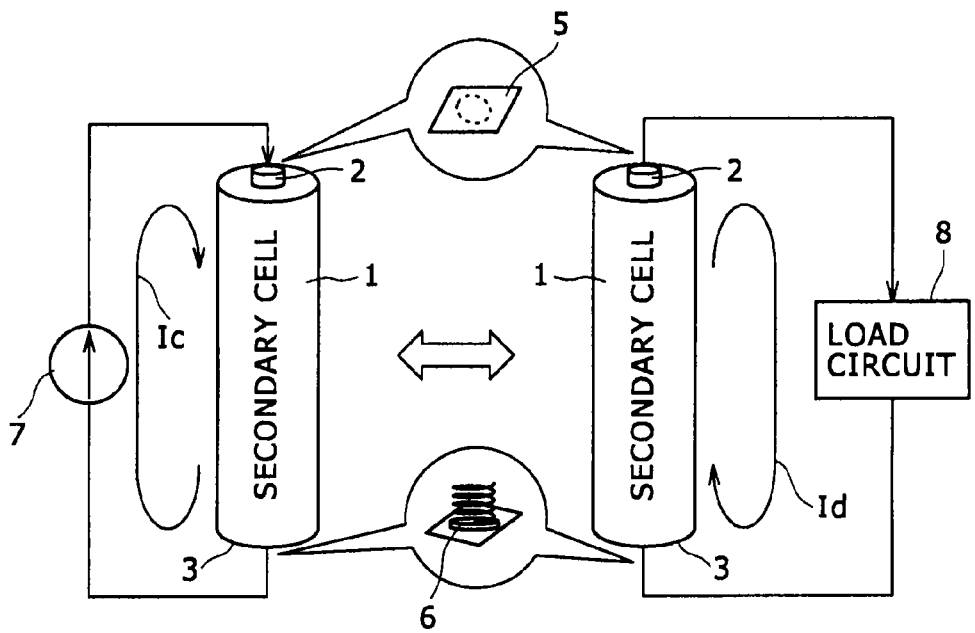
FIG. 14A is a schematic diagram of charging of a conventional secondary cell.
FIG. 14B is a schematic diagram of discharging of a conventional secondary cell.

On the other hand, as an example which utilizes the advantage described in the item (i) given hereinabove, an application as a power supply station is available. For example, if one cell apparatus 30 is placed in a bag as seen in FIG. 12, then supply of power to a portable telephone terminal 321, a music player 322, a game machine not shown and so forth in the bag can be carried out simultaneously, and there is no necessity to prepare individual battery chargers.

[Other Embodiments and Modifications]

While, in the embodiments described hereinabove, the resonance relationship between resonance elements is given by magnetic field resonance, the present invention can be applied also where magnetic field resonance is applied.

It should be understood by those skilled in the art that various modifications, combinations, sub-combinations and alterations may occur depending on design requirements and other factors insofar as they are within the scope of the appended claims or the equivalents thereof.

What is claimed is:

1. A cell apparatus which emits and receives AC power via magnetic field resonance coupling to an external device, comprising:

a secondary cell;

a cell interface to interface with the secondary cell;

a first circuit to generate, by discharging the secondary cell in a discharging mode, a magnetic field to induce an AC current in the external device when the cell apparatus is inserted into a cell apparatus accommodating section of the external device, and to generate, in a charging mode to charge the cell, an AC current from a magnetic field received from the external device;

a conversion circuit to generate, in the charging mode, a charge signal from the AC current generated in the first circuit, the conversion circuit supplying the charge signal to the cell interface;

a frequency generator to generate, in the discharging mode, an AC current from a discharge signal received from the cell interface, the frequency generator supplying the AC current to the first circuit;

an input device to receive a selection of the charging mode and the discharging mode;

circuitry configured to generate a control signal based on the selection; and a switching circuit to couple, based on the control signal, the cell interface to the conversion circuit and the conversion circuit to the first circuit in the charging mode, and couple the cell interface to the frequency generator and the frequency generator to the first circuit in the discharging mode, wherein the cell apparatus accommodating section of the external device is formed in a hinge portion thereof to accommodate a single cell apparatus.

2. The cell apparatus according to claim 1, wherein the input device is a slide switch.

3. The cell apparatus according to claim 1, wherein the input device is a magnetic sensor to receive the selection based on detection of another magnetic field.

4. The cell apparatus according to claim 1, wherein the first circuit includes a resonance element coupled to an excitation element, the excitation element being coupled to the switching circuit.

5. The cell apparatus according to claim 4, wherein the resonance element and the excitation element are air-core coils having a same self-resonance frequency, and the frequency generator generates the AC current at the self-resonance frequency.

6. The cell apparatus according to claim 1, wherein the input device is a sensor.

7. The cell apparatus according to claim 1, wherein the frequency generator is a Kollwitz oscillator circuit.

8. The cell apparatus according to claim 1, wherein the frequency generator is a Hartley oscillator circuit.

9. The cell apparatus according to claim 1, wherein the input device is a micro switch to receive the selection based on mechanical engagement with the external device.

10. The cell apparatus according to claim 1, wherein the conversion circuit is a rectifier circuit.

11. The cell apparatus according to claim 6, wherein the sensor is an optical sensor.

12. A cell apparatus which emits and receives AC power via magnetic field resonance coupling to an external device, comprising:

a cell to store an electric charge;

a first circuit to generate, by discharging of the cell in a discharging mode, a magnetic field to induce an AC current in the external device when the cell apparatus is inserted into a cell apparatus accommodating section of the external device, and to generate, in a charging mode to charge the cell, an AC current from a magnetic field received from the external device;

a conversion circuit to generate, in the charging mode, a charge signal from the AC current generated in the first circuit, the conversion circuit supplying the charge signal to the cell; and a frequency generator to generate, in the discharging mode, an AC current from a discharge signal received from the cell, the frequency generator supplying the AC current to the first circuit;

an input device to receive a selection of the charging mode and the discharging mode;

circuitry configured to generate a control signal based on the selection; and a switching circuit to couple, based on the control signal, the cell to the conversion circuit and the conversion circuit to the first circuit in the charging mode, and couple the cell to the frequency generator and the frequency generator to the first circuit in the discharging mode, wherein the cell apparatus accommodating section of the external device is formed in hinge portion thereof to accommodate a single cell.

13. The cell apparatus according to claim 12, wherein the input device is a slide switch.

14. The cell apparatus according to claim 12, wherein the input device is a magnetic sensor to receive the selection based on detection of another magnetic field.

15. The cell apparatus according to claim 12, wherein the first circuit includes a resonance element coupled to an excitation element, the excitation element being coupled to the switching circuit.

16. The cell apparatus according to claim 15, wherein the resonance element and the excitation element are air-core coils having a same self-resonance frequency, and the frequency generator generates the AC current at the self-resonance frequency.

17. The cell apparatus according to claim 12, wherein the input device is a sensor.

18. The cell apparatus according to claim 12, wherein the frequency generator is a Kollwitz oscillator circuit.

19. The cell apparatus according to claim 12, wherein the frequency generator is a Hartley oscillator circuit.

20. The cell apparatus according to claim 12, wherein the input device is a micro switch to receive the selection based on mechanical engagement with the external device.

21. The cell apparatus according to claim 12, wherein the conversion circuit is a rectifier circuit.

22. The cell apparatus according to claim 12, wherein the cell is a secondary cell.

23. A cell apparatus which emits and receives AC power via magnetic field resonance coupling to an external device, comprising:

means for interfacing with a cell;

means for generating, through discharge of the cell in a discharging mode, a magnetic field to induce an AC current in the external device when the cell apparatus is inserted into a cell apparatus accommodating section of the external device;

means for generating, in a charging mode to charge the cell, a first AC current from a magnetic field received from the external device;

means for generating, in the charging mode, a charge signal from the first AC current generated, the charge signal being supplied to the means for interfacing; and means for generating, in the discharging mode, a second AC current from a discharge signal received via the means for interfacing, the second AC current being supplied to the means for generating a magnetic field;

means for receiving a selection of the charging mode and the discharging mode;

means for generating a control signal based on the selection;

means for coupling, based on the control signal, the means for interfacing to the means for generating the charge signal and the means for generating the charge signal to the means for generating the first AC current in the charging mode; and means for coupling, based on the control signal, the means for interfacing to the means for generating the second AC current and the means for generating the second AC current to the means for generating the magnetic field in the discharging mode, wherein the cell apparatus accommodating section of the external device is formed in a hinge section thereof to accommodate a single cell apparatus.

24. The cell apparatus according to claim 23, wherein the means for receiving receives the selection via mechanical actuation.

25. The cell apparatus according to claim 23, wherein the means for receiving receives the selection via detection of another magnetic field.

26. The cell apparatus according to claim 23, wherein the means for receiving receives the selection via mechanical engagement with the external device.

27. The cell apparatus according to claim 23, wherein the means for receiving receives the selection via a sense signal.

28. The cell apparatus according to claim 23, wherein the cell is a secondary cell.

29. A cell apparatus which emits and receives AC power via contactless coupling to an external device, comprising:

a cell interface to interface with a cell;

a first circuit to generate, by discharge of the cell in a discharging mode, an AC current in the external device when the cell apparatus is inserted into a cell apparatus accommodating section of the external device, and to generate, in a charging mode to charge the cell, an AC current via contactless coupling to the external device;

a conversion circuit to generate, in the charging mode, a charge signal from the AC current generated in the first circuit, the conversion circuit supplying the charge signal to the cell interface; and a frequency generator to generate, in the discharging mode, an AC current from a discharge signal received from the cell interface, the frequency generator supplying the AC current to the first circuit;

an input device to receive a selection of the charging mode and the discharging mode;

circuitry configured to generate a control signal based on the selection; and a switching circuit to couple, based on the control signal, the cell interface to the conversion circuit and the conversion circuit to the first circuit in the charging mode, and couple the cell interface to the frequency generator and the frequency generator to the first circuit in the discharging mode, wherein the cell apparatus accommodating section of the external device is formed in a hinge portion thereof to accommodate a single cell.

* * * * *